United States Patent [19]

Nishiwaki et al.

[11] Patent Number: 4,989,461
[45] Date of Patent: Feb. 5, 1991

[54] WEB TENSION METER AND WEB TENSION CONTROLLER

[75] Inventors: Nobuhiko Nishiwaki; Sankei Hori; Noriyuki Shiba, all of Tokyo, Japan

[73] Assignee: Tokyo Kikai Seisakusho, Ltd., Tokyo, Japan

[21] Appl. No.: 363,752

[22] Filed: Jun. 9, 1989

[30] Foreign Application Priority Data

Jun. 21, 1988 [JP] Japan .................. 63-151156

[51] Int. Cl.$^5$ .............................. G01L 5/08
[52] U.S. Cl. ................................ 73/862.45
[58] Field of Search ............... 73/862.45, 862.07, 37.7, 73/37.6, 37.5; 242/75

[56] References Cited

U.S. PATENT DOCUMENTS

| | | | |
|---|---|---|---|
| 2,728,223 | 12/1955 | Herrman | 73/862.07 X |
| 2,953,918 | 9/1960 | Fowler et al. | 73/37.5 |
| 3,490,058 | 1/1970 | Fortier | 73/37.5 |
| 3,599,485 | 8/1971 | Muhlberg | 73/862.07 X |
| 3,779,074 | 12/1973 | Breyer | 73/862.07 |
| 3,999,428 | 12/1976 | Zurcher | 73/862.45 |
| 4,711,133 | 12/1987 | Berglund . | |

FOREIGN PATENT DOCUMENTS 63-17159 2/1988 Japan .

Primary Examiner—Charles A. Ruehl
Attorney, Agent, or Firm—Armstrong, Nikaido, Marmelstein, Kubovcik & Murray

[57] ABSTRACT

A simply constructed web tension meter is of reduced dimensions capable of preventing an object material from being displaced during a web tension measuring operation. The meter consists of a hollow body provided with an inlet port to which a fluid supply source is connected. An ejection port is opposed to one surface of the object material with a clearance left therebetween. An internal pressure measuring port, and a web tensioning unit are provided with a pressure measuring device joined to the internal pressure measuring port. This meter further includes as necessary another hollow body provided with an upstream port connected to a fluid supply source, and discharge ports opposed to the other surface of the object material with a clearance left therebetween. A web tension controller consists of the same web tension meter as mentioned above in an object material handling apparatus, and a web tension regulator regulates the tension imparted to the moving object material. To the web tension regulator, a processing device in the web tension meter is connected through a control signal transmitter.

2 Claims, 3 Drawing Sheets

WEB TENSION METER AND WEB TENSION CONTROLLER

BACKGROUND OF THE INVENTION:

1. Field of the Invention:

This invention relates to a web tension meter for measuring the tension of a web of material, an object material to be examined, with the meter kept not in contact with the web, and a web tension controller adapted to control a means for regulating the web tension, in accordance with a suitable signal based on the level of the web tension measured by the web tension meter. For example, a web, a material to be examined, which is subjected to these measurement operations, consists of a web moved along a guide member between a paper feed unit and a folding unit in a rotary press.

2. Description of the Prior Art:

The prior art web tension meters applied to a web moved along a guide member in a rotary press include a web tension meter in which a web tension is measured by a differential transformer attached to a guide roller, and a web tension meter in which a web tension is measured by determining a quantity of displacement of a floating roller, one of guide rollers, as a quantity of turning movement of a displacement support shaft, as disclosed in, for example, Japanese Utility Model Laid-open No. 17159/1988. This publication also discloses web tension controllers applied to a web and using these web tension meters.

There is another prior art web tension meter (refer to the specification of U.S. Pat. No. 4711133) applied to a material to be examined, in which a pressure gas is supplied into a hollow chamber, which is opened in a position slightly away from a material to be examined, from the rear side of the same chamber, a gas pressure in a position at the edge of the opening of the hollow chamber and in the vicinity of the material being measured via an annular opening, which is provided so as to surround the previously-mentioned opening, and a hollow chamber communicating with this annular opening, whereby the tension of the material is determined.

These prior art web tension meters have their respective problems.

First, in the web tension meter disclosed in Japanese Utility Model Laid-open No. 17159/1988, in which a web tension is measured by a differential transformer attached to a guide roller, it is necessary that three rollers be installed for the measurement of a web tension, and the necessity of securing a space for the installation of the rollers impedes the designing of the meter. If the differential transformers are provided on the support portions at both sides of the measuring rollers, the imbalance of a web tension in the widthwise direction of a web can be measured to a certain extent. However, in a case where a web is passed in a laterally biased state around the measuring rollers, it becomes difficult to measure this imbalance.

The web tension meter disclosed in the same publication and adapted to measure a quantity of displacement of a floating roller as a quantity of turning movement of a displacement support shaft does not require the web tension measuring means provided in the above web tension meter using a differential transformer, so that it is free from design restrictions. However, the quantity of turning movement of the displacement support shaft cannot be varied at both sides, and, therefore, the imbalance of web tension in the widthwise direction of the web cannot be measured.

In the web tension meters disclosed in U.S. Pat. No. 4711,133, the problems in the above two examples disclosed in Japanese Utility Model Laid-open No. 17159/1988 are solved. However, the measuring head in this patent consists of a fixed member, a slide member adapted to be displaced slidingly with respect to the fixed member, and an urging member disposed between the fixed member and slide member, and it is necessary that the hollow chamber opened at one side of the slide member, the annular opening surrounding the opening of the hollow chamber and used to measure the gas pressure in a position on the side of the edge of this opening and in the vicinity of a material to be examined, and the hollow chamber communicating with the annular opening be provided separately. This causes the construction of the web tension meter to become complicated, and results in an increase in the price of the meter and maintenance troubles.

SUMMARY OF THE INVENTION

The web tension meter according to the present invention consists of a hollow body provided at the upstream side thereof with an inlet port to which a fluid supply source is connected, at the downstream end portion thereof with an ejection port the outer end surface of which is opposed to a surface of an object material with a clearance of a predetermined width left therebetween, and at the intermediate portion thereof which is on the downstream side of the inlet port with an internal pressure measuring port, and web tension measuring unit provided with at least a pressure measuring means joined to the internal pressure measuring port, this web tension meter further including in certain cases another hollow body provided at the upstream side thereof with an upstream port connected to a fluid supply source, and at the downstream side thereof with discharge ports opposed to the ejection port of the first-mentioned hollow body and to the other surface of the object material with a clearance of a predetermined width left therebetween.

The web tension controller according to the present invention consists of a web tension meter in an object-material handling apparatus, which web tension meter has a hollow body disposed in a suitable position with respect to an object material, and a web tension measuring unit provided with a pressure measuring means and a processing means connected to the pressure measuring means; and a web tension regulator adapted to regulate the web tension of the moving object material, to which web tension regulator the processing means is connected through a control signal transmitter.

In the web tension meter, a fluid from the fluid supply source, for example, compressed air is supplied to the interior of the hollow body via the inlet port. The compressed air flowing into the hollow body is ejected from the ejection port toward the object material.

It is considered that, during this operation, the ejected compressed air is diffused from the outer circumferential surface of an imaginary circular cylinder having a height equal to the distance between the outer end surface of the ejection port and the opposed surface of the object material, and a diameter equal to the inner diameter of the ejection port. Accordingly, since the area of the outer circumferential surface of this imaginary circular cylinder increases in proportion to the easiness of diffusion of the ejected compressed air, i.e.

the distance between the outer end surface of the ejection port and the opposed surface of the object material, the ejection rate of the compressed air increases in proportion thereto. Since the internal pressure of the hollow body decreases in inverse proportion to the ejection rate of the compressed air, the pressure measured by the pressure measuring means also decreases in inverse proportion thereto.

The object material receiving the ejection force of the compressed air is displaced backward until this ejection force, a tension imparted to the object material and the rigidity of the object material which is determined by the characteristics of the material itself have been balanced.

Since the object material is obtained with its characteristics at a substantially constant level, the rigidity of the material varies depending upon the tension imparted thereto. Namely, the rigidity of the material can be determined as a function of a web tension.

Since the ejection rate of the compressed air and the internal pressure of the hollow body vary in accordance with the rigidity of the object material, the tension of the material can be determined by measuring the internal pressure of the hollow body.

In a case where a fluid discharge unit is additionally provided, compressed air is supplied to the interior of a hollow body therein via an upstream port thereof, and the compressed air flowing into the hollow body is discharged from a discharge port toward the opposed surface of the object material against the ejected flow of the compressed air from the ejection port of the previously-mentioned hollow body. Thus, the tension of the object material is measured by the same operation as in the previously-described web tension meter as the unnecessary displacement ascribed to the ejected flow of the compressed air from the ejection port of the first-mentioned hollow body is prevented.

During this operation, the discharging of the compressed air from the discharge port is, of course, done in such a manner that the discharged compressed air does not influence upon the tension imparted to the object material.

In the web tension controller in the object material handling apparatus, the level of the tension imparted to the object material moving in the apparatus is determined in each pressure measuring means, and these levels determined are input into the control signal transmitter. An operating signal is sent from the control signal transmitter to the web tension regulator so as to correct the web tension to a predetermined proper level in accordance with the level of web tension input into this signal transmitter. The web tension regulator which has thus received an operating signal is actuated to correct the levels of web tension at the portions being measured of the object material to proper levels. Since the regulating operation of the web tension regulator continues to be carried out until the actual levels of web tension measured have agreed with the proper levels of web tension, the web tension of each portions being measured of the object material are maintained at proper levels.

The object as well as advantageous features of the invention will become apparent from the following description of the preferred embodiments taken in conjunction with the accompanying Drawings.

DESCRIPTION OF THE PREFERRED EMBODIMENTS

Figure 1:
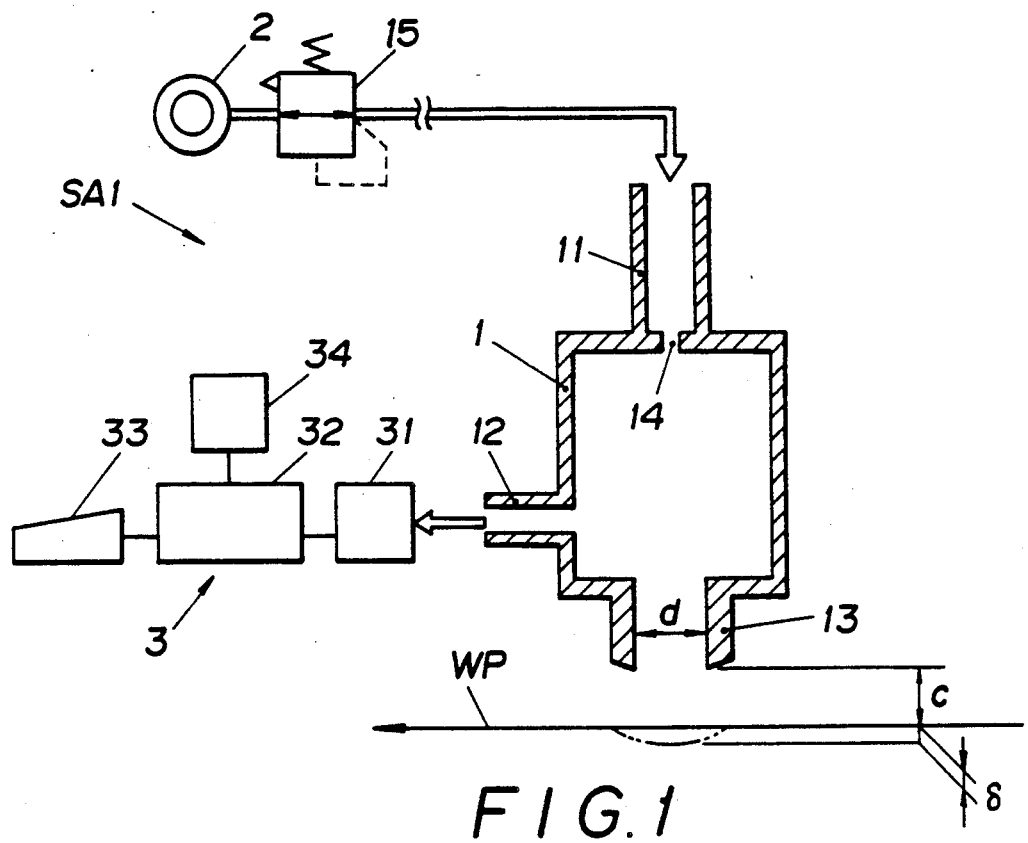
FIG. 1 is a schematic construction diagram of an embodiment of the web tension meter according to the present invention.

A web tension meter SA1 consists of a hollow body 1, a fluid supply source 2 connected to the hollow body 1 via an inlet port 11 provided at the upstream side portion of the hollow body 1, and a web tension measuring unit 3 connected to the hollow body 1 via an internal pressure measuring port 12 provided at the intermediate portion of the hollow body 1 which is on the downstream side of the inlet port 11. The hollow body 1 is further provided at the most downstream side portion thereof with a cylindrical ejection port 13 of an inner diameter d opposed at the outer end surface thereof to one surface of, for example, a web WP with a clearance c of a predetermined width left therebetween, and and in the inlet port 11 with an orifice 14.

The web tension measuring unit 3 consists of a pressure measuring means 31, a processor 32 connected to the pressure measuring means 31 and adapted to process the data measured by the measuring means 31, and an input means 33 and a display 34 which are connected to the processor 32 as necessary.

In the web tension meter SA1, one or a plurality of hollow bodies 1, which constitute measuring heads, in combination with pressure measuring means 31 are provided.

Figure 3:
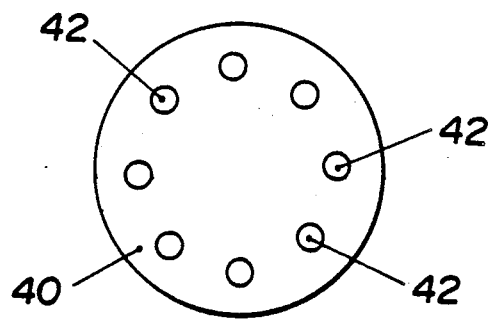
FIG. 3 is a sectional view taken along the line III—III in FIG. 2.
Figure 2:
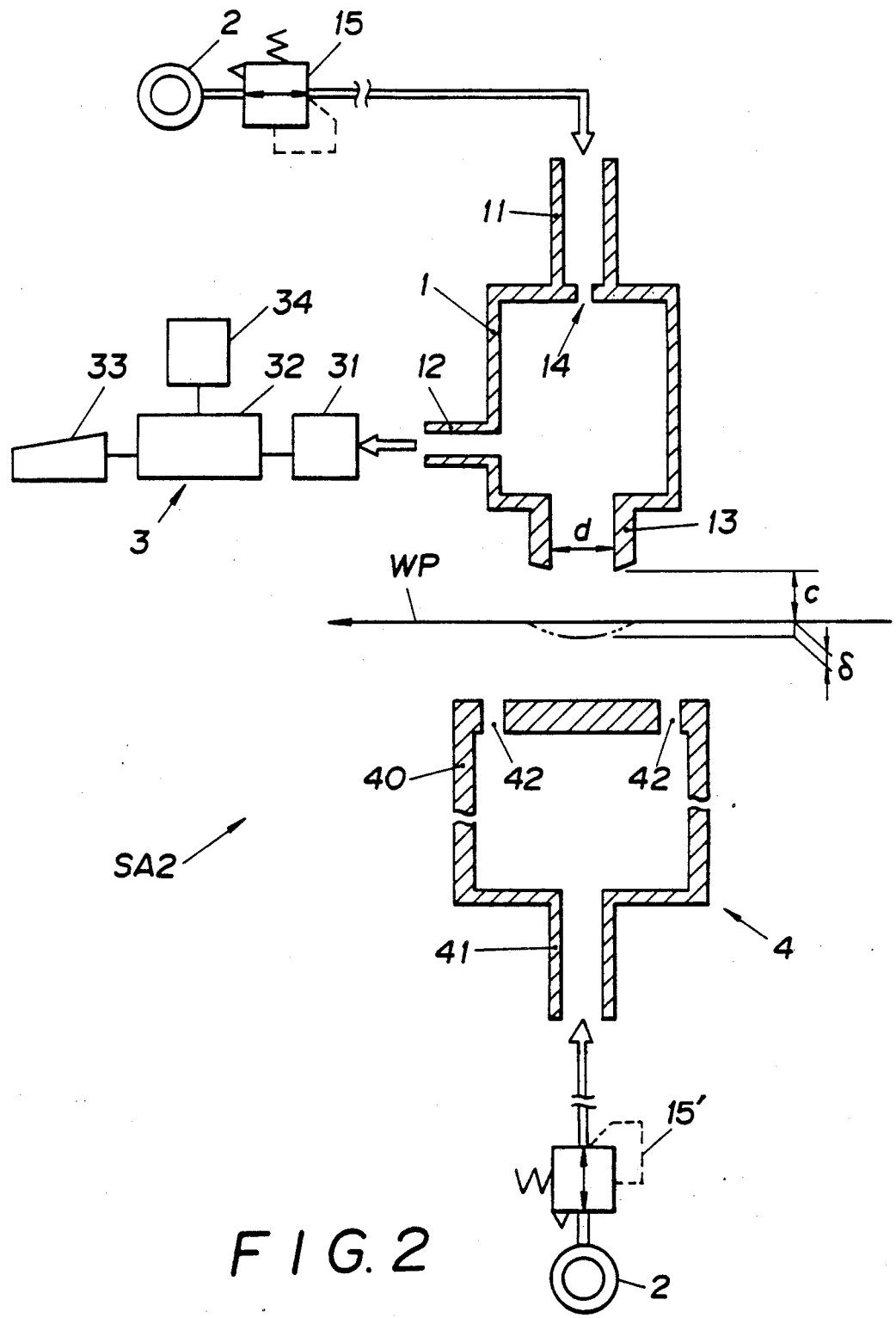
FIG. 2 is a schematic construction diagram of another embodiment of the web tension meter according to the present invention.

Another mode of web tension meter SA2 embodying the present invention is shown in FIGS. 2 and 3.

The web tension meter SA2 consists of a web tension meter identical with the web tension meter SA1 to which a fluid discharge means 4 is added, which is opposed to the hollow body 1 via a web WP moving therebetween.

The fluid discharge means 4 consists of a hollow body 40 which is provided at the upstream portion thereof with an upstream port 41 to which a fluid supply source 2 or some other type of fluid supply source 15 is connected, and at the downstream portion thereof with circumferentially regularly spaced discharge ports 42, 42 . . . opposed via a clearance to the surface of an object material, for example, the web WP which is opposite to the surface thereof opposed to an ejection port 13. The axis around which the discharge ports 42, 42 . . . are circularly arranged is in alignment with the axis of the ejection port 13 of a hollow body 1. In a case where a plurality of hollow bodies 1 are provided, the same number of hollow bodies 40 are provided so as to form pairs.

Figure 4:
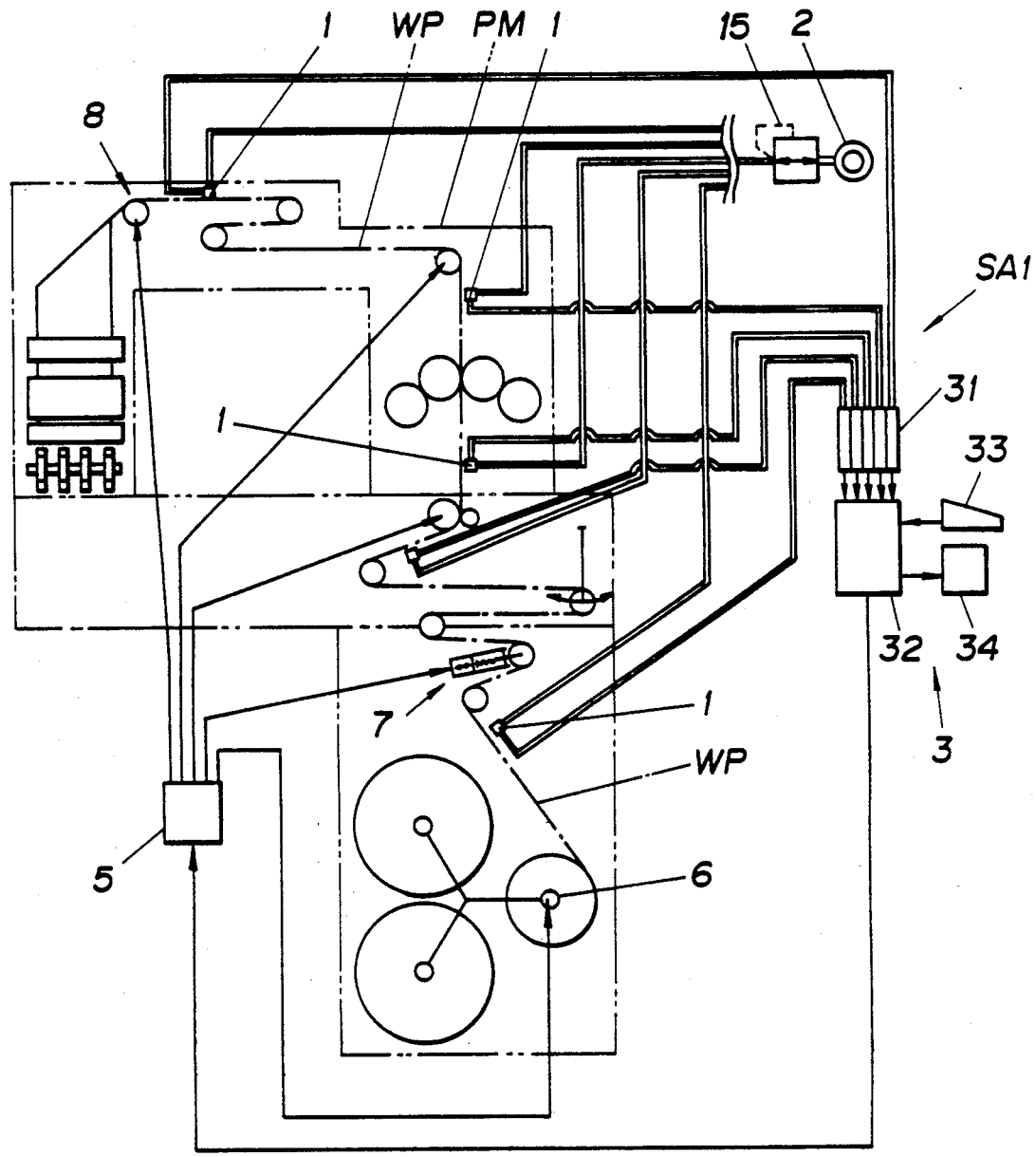
FIG. 4 is a schematic construction diagram of an embodiment of the web tension controller according to the present invention.

A web tension controller embodying the present invention is shown in FIG. 4. The drawing shows a rotary press PM provided with a web tension controller having a web tension meter.

The web tension meter shown in FIG. 3 consists of a web tension meter SA1 referred to above, which may be substituted by a web tension meter SA2 mentioned above. In the web tension controller, a web tension meter SA1 provided with hollow bodies 1, which constitute measuring heads, in suitable positions with respect to various phases of the web WP in a rotary press PM is connected via control signal transmitter 5 to web tension regulating means including a web brake means 6, an imbalance regulating roller means 7 adapted to eliminate the imbalance of the web tension of the left and right portions of the moving web WP, and a draw rate regulating roller means 8 adapted to regulate a draw rate of a predetermined section of the web WP.

A suitable number of hollow bodies 1, which constitute measuring heads, are also provided in the widthwise direction of the web WP as necessary in accordance with the phase of the web WP.

The operation of the web tension meters and the web tension controller for a rotary press provided with a web tension meter will now be described.

First, in the web tension meter SA1 shown in FIG. 1, a fluid, for example, compressed air from the fluid supply source 2 is set to a predetermined pressure by a pressure regulator 15, and then supplied to the interior of the hollow body 1 via the inlet port 11. During this time, the compressed air flows into the interior of the hollow body 1 as the flow rate thereof is restricted by the orifice 14.

The compressed air which has flowed into the hollow body 1 in this manner is ejected from the ejection port 13 toward the web WP.

Figure 5:
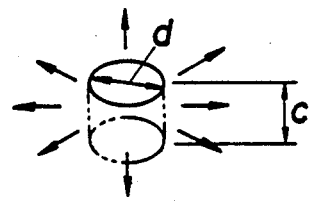
FIG. 5 illustrates the diffusion of the compressed air in an embodiment of the web tension meter according to the present invention.

It is considered that the compressed air thus ejected is diffused from the outer circumferential surface of an imaginary cylinder having a height equal to the distance c between the outer end surface of the ejection port 13 and the opposed surface of the web WP, and a diameter equal to the inner diameter d of the ejection port 13 (refer to FIG. 5). The area $\pi dc$ of the outer circumferential surface of this imaginary cylinder increases as the easiness of the diffusion of the compressed air, i.e. the distance c increases, so that the ejection rate of the compressed air increases in proportion thereto. Since the internal pressure of the hollow body decreases in inverse proportion to the ejection rate, the pressure measured at the pressure measuring means 31 decreases in the same manner.

Let $P_1$, $P_2$, $a_1$, $a_2$, $C_1$ and $C_2$ equal a fluid supply pressure (pressure set by the regulator), internal pressure of the hollow body, cross-sectional area of the orifice, area of the ejection portion (circumferential surface of the imaginary cylinder), flow coefficient of the orifice and flow coefficient of the ejection port, respectively. The above-described relation is expressed by the equation, $$P_2 = P_1/\{1 + (C_2 a_2/C_1 a_1)^2\} \tag{1}$$

The web WP which receives a force generated by the ejection of the compressed air is displaced backward until this force and the rigidity of the web WP determined by the web tension imparted to the web WP and the characteristics of the web WP in use, such as the density of the fiber constituting the web WP, a binder in use and the thickness of the web WP have been balanced.

The relation between the quantity of backward displacement of the web WP and the data thereon is expressed by the equation, $$\delta = F/K \tag{2}$$

wherein $\delta$ is the quantity of backward displacement; F is a force which the web WP receives due to the ejection of the compressed air; and K is the rigidity of the web WP.

The force F which the web WP receives due to the ejection of the compressed air is expressed by the equation, $$F = \pi d^2 \rho w^2/4 \tag{3}$$

wherein $\rho$ is the density of the air; and w a velocity of flow ($= \sqrt{2P_2/\rho}$).

The area $a_2$ of the ejection portion (outer circumferential surface of the imaginary cylinder) in a case where the web WP is displaced backward by $\delta$ as mentioned above due to the ejection of the compressed air is expressed by the equation, $$a_2 = \pi d(c + \delta) \tag{4}$$

Therefore, the above equation (1) can be turned into the equation, $$P_2 = P_1/[1 + \{C_2 \pi d(C + \delta)/C_1 a_1\}^2] \tag{1'}$$

On the other hand, from the equations (2) and (3), the equation, $$\delta = (\pi d^2 \rho w^2/4)/K \tag{2'}$$

wherein $w = \sqrt{2P/\rho}$ is obtained.

Therefore, from the equations (1') and (2'), the equation, $$K = P_2 \pi d^2/2\{C_1 a_1/C_2 \pi d)\sqrt{(P_1 - P_2)/P_2} - c\} \tag{5}$$

is obtained.

Since the webs WP of the same kind, i.e. the webs WP of, for example, the same brand or article number have a substantially equal characteristic level (for example, equal air permeability), the rigidity K of the web WP varies depending upon the tension T. Namely, the rigidity K is determined as a function f(T) of the tension T. Accordingly the equation (5) can be turned into the equation, $$f(T) = P_2 \pi d^2/2\{(C_1 a_1/C_2 \pi d)\sqrt{(P_1 - P_2)/P_2} - c\} \tag{5'}$$

The right side of this equation is a function of the internal pressure P2 of the hollow body 1. Accordingly, while the compressed air is ejected from the ejection port 13 toward the web WP, the internal pressure of the hollow body 1 can be measured with the pressure measuring means 31 connected to the internal pressure measuring port 12 so as to determine the tension of the web WP.

During this time, the pressure level measured by the pressure measuring means 31 is processed in the processor 32 in relation to the characteristics of the web WP which have been already input from the input means 33 into the processor 32, and a signal representative of the results is output in a suitable manner to the display 34.

In the web tension meter SA2 shown in FIGS. 2 and 3, the pressure of a fluid, for example, compressed air from the fluid supply source 2 or some other fluid supply source 15' is set constant by a pressure regulator 15' which is other than the pressure regulator 15 provided in the fluid supply passage extending to the inlet port 11 of the hollow body 1, and the resultant compressed air is supplied to the interior of the hollow body 40 via the upstream port 41. The compressed air which has flowed into the hollow body 40 is discharged from the discharge ports 42, 42 . . . toward the surface of the web WP which is on the opposite side of the surface thereof toward which the compressed air from the ejection port 13 flows, against this ejected flow of compressed air. Thus, the tension of the web WP can be measured by the same operation as in the previously-mentioned web tension meter SA1 with the unnecessary displacement of the web WP ascribable to the ejected flow from the ejection port 13 prevented.

During this operation, the discharging of the compressed air from the discharge ports 42, 42 . . . is, of course, done so as not to influence upon the web tension imparted to the web WP but the rigidity K of the web WP is necessarily influenced by the discharge power (discharge rate and discharge pressure) of the air sent out from the discharge ports 42, 42 . . . and the size of a region enveloped by the discharge air of the surface of the web WP. If the power of the discharge air and the size of the region enveloped by the discharged air of the surface of the web WP are set to predetermined levels, the degrees of influence of them upon the rigidity of the web WP become constant, so that the relation expressed by the equation (5') is established as in the web tension meter SA1. According to the results of an experiment, the web tension meter SA2 has a good effect, i.e. a high accuracy in the range of low tension working on the web WP.

In the web tension controller of FIG. 4 for a rotary press provided with the web tension meter SA1 the tension imparted to the web WP in various phases of the same that is moved in the rotary press PM is determined at the pressure measuring means 31, and signals representative of the web tension are input into the control signal transmitter 5 connected to the processor 32 in the web tension meter SA1. In the control signal transmitter 5, preset proper levels of tension imparted to the web WP in various phases and the measured levels of web tension input from the processor 32 thereinto are compared. When the levels of tension imparted to the web WP in various phases are not proper, a regulating signal based on a difference between a measured level and a preset level is output to the web tension regulator in each phase, for example, the web brake 6, imbalance regulating roller 7 and draw rate regulating roller 8. Each of these web tension regulators which has received the regulating signal is operated so that the tension of the web WP in each phase attains the proper level. In accordance with this operation, the regulation of the web tension by the web tension regulators is continued until the measured levels of web tension and the proper levels thereof have agreed with each other, so that the tension of the web WP in each phase is maintained at a proper level.

In a case where hollow bodies 1 are provided in the widthwise direction of the web WP, the tensile condition of the web WP in the widthwise direction can also be recognized. Therefore, a web tension imbalance regulating operation in the widthwise direction of the web WP by the imbalance regulating roller 7 among the web tension regulators can be carried out effectively.

In the web tension measuring unit 3, the processor 32 and input means 33 are not always required. When the condition of the web WP, and object material, (further including the power of discharged fluid from the fluid discharge means 4 and the size of the region, which is enveloped by the discharged fluid, of the web WP in a case where the fluid discharge means 4 is additionally provided) is constant at all times, a display 34 provided with a scale with numerals which are obtained by carrying out conversion so that the levels of pressure measured by the pressure measuring means 31 can be read directly as the levels of the tension of the web WP may be connected to or incorporated in the pressure measuring means 31.

In the web tension meter according to the present invention, the measuring head consists of a hollow body having a simple and miniaturized construction and capable of being maintained easily. Therefore, this web tension meter can be advantageously designed and installed in an object-material handling apparatus. Moreover, the tension on each portion of the surface of an object material can be measured individually, and the distribution of tension of the object material on the object material treatment apparatus can also be thoroughly investigated.

Owing to the additionally provided fluid discharge means, the tension of the object material is measured with the undue displacement of the object material ascribable to the ejected flow of fluid from the ejection port of the hollow body prevented. This enables the web tension measuring accuracy to be improved.

In the object material handling apparatus provided with the web tension controller using the web tension meter, the tension of each part of an object material can be controlled with a high accuracy by making use of the advantages mentioned above of the web tension meter, and the object material can be handled easily with a proper level of tension imparted to the object-material as a whole.

The present invention is not, of course, limited to the above embodiments; it may be modified in various ways within the scope of the appended claims.

What Is Claimed Is:

1. A web tension meter comprising a first hollow body provided at an upstream portion thereof with an inlet port to which a fluid supply source is connected, at a downstream end portion thereof with an ejection port an outer end surface of which is opposed to one surface of an object material with a clearance of a predetermined width left therebetween, and at an intermediate portion thereof between said inlet port and said ejection port with an internal pressure measuring port, a web tension measuring unit provided with at least a pressure measuring means joined to said internal pressure measuring port, a second hollow body provided at an upstream portion thereof with an upstream port to which a second fluid supply source is connected, and at a downstream portion thereof with discharge ports opposed to said ejection port of said first hollow body and to another surface of said object material with a predetermined width left therebetween, and means for controlling a pressure of said first and second fluid supply sources so that said web is not deflected due to fluid ejected from said ejection port of said first hollow body.

2. A web tension controller in an object material handling apparatus comprising a plurality of web tension meters opposing said object material at different locations, wherein a web tension measuring unit in each of said web tension meters is provided with a pressure measuring means, a processor connected to said pressure measuring means, and a web tension regulator adapted to regulate the tension of said moving object material, said processor being connected to said web tension regulator through a control signal transmitter; each of said web tension meters comprising a first hollow body provided at an upstream portion thereof with an inlet port to which a fluid supply source is connected, at a downstream end portion thereof with an ejection port an outer end surface of which is opposed to one surface of an object material with a clearance of a predetermined width left therebetween, and at an intermediate portion thereof between said inlet port and said ejection port with an internal pressure measuring port, said web tension measuring unit joined to said internal pressure measuring port, a second hollow body provided at an upstream portion thereof with an upstream port to which a second fluid supply source is connected, and at a downstream portion thereof with discharge ports opposed to said ejection port of said first hollow body and to another surface of said object material with a predetermined width left therebetween, and means for controlling a pressure of said first and second fluid supply sources so that said web is not deflected due to fluid ejected from said ejection port of said first hollow body.

* * * * *